United States Patent
Ono

(10) Patent No.: US 10,088,340 B2
(45) Date of Patent: Oct. 2, 2018

(54) TELECENTRIC PHOTOELECTRIC ENCODER INCLUDING APERTURE IN FACE OF OPTICAL ELEMENT

(71) Applicant: Mitutoyo Corporation, Kawasaki, Kanagawa (JP)

(72) Inventor: Kimitoshi Ono, Yamato (JP)

(73) Assignee: MITUTOYO CORPORATION, Kawasaki (JP)

( * ) Notice: Subject to any disclaimer, the term of this patent is extended or adjusted under 35 U.S.C. 154(b) by 60 days.

(21) Appl. No.: 15/262,412

(22) Filed: Sep. 12, 2016

(65) Prior Publication Data

US 2017/0074686 A1 Mar. 16, 2017

(30) Foreign Application Priority Data

Sep. 14, 2015 (JP) .................................. 2015-180529

(51) Int. Cl.
G01D 5/347 (2006.01)
H04N 5/225 (2006.01)
(Continued)

(52) U.S. Cl.
CPC ..... *G01D 5/34715* (2013.01); *G01D 5/34746* (2013.01); *G02B 3/0062* (2013.01);
(Continued)

(58) Field of Classification Search
CPC ........... G01D 5/34715; G01D 5/34746; H04N 5/2256; G02B 5/18; G02B 13/22; G02B 3/0062
See application file for complete search history.

(56) References Cited

U.S. PATENT DOCUMENTS 6,115,175 A * 9/2000 Maruyama .......... G03F 7/70241
356/511
6,816,237 B2 * 11/2004 Ueyama .................... G02B 3/00
355/67

(Continued)

FOREIGN PATENT DOCUMENTS

EP 2 674 730 12/2013
EP 2 743 650 6/2014
(Continued)

OTHER PUBLICATIONS

European Search Report dated Feb. 22, 2017, Applicaton No. 16185194.4, 6 pages.

*Primary Examiner* — Que T Le
*Assistant Examiner* — Jennifer Bennett
(74) *Attorney, Agent, or Firm* — Rankin, Hill & Clark LLP

(57) ABSTRACT

A photoelectric encoder of the present invention includes: a scale which includes a grid scale; a light emitting portion which irradiates light toward the scale; a light receiving portion which detects an image of the grid scale of the scale; and a telecentric optical unit which is provided between the scale and the light receiving portion and forms the image of the grid scale on the light receiving portion, wherein the telecentric optical unit includes a first optical element which is disposed near the scale, a second optical element which is disposed near the light receiving portion in relation to the first optical element and is disposed so that a gap is formed between the second optical element and the first optical element, and an aperture which is provided in at least one of a face near the second optical element in the first optical element and a face near the first optical element in the second optical element.

10 Claims, 12 Drawing Sheets

(51) Int. Cl.
*G02B 5/18* (2006.01)
*G02B 13/22* (2006.01)
*G02B 3/00* (2006.01)

(52) U.S. Cl.
CPC ............... *G02B 5/18* (2013.01); *G02B 13/22* (2013.01); *H04N 5/2256* (2013.01)

(56) References Cited

U.S. PATENT DOCUMENTS

| | | | |
|---|---|---|---|
| 2006/0202112 A1* | 9/2006 | Mizutani | G01D 5/34784 250/231.13 |
| 2009/0261233 A1* | 10/2009 | Tamiya | G01B 11/00 250/201.2 |
| 2011/0031383 A1 | 2/2011 | Tobiason et al. | |
| 2013/0181121 A1* | 7/2013 | Tobiason | G01D 5/34715 250/231.1 |

FOREIGN PATENT DOCUMENTS

| | | |
|---|---|---|
| JP | 2011-59055 | 3/2011 |
| WO | 2005/090923 | 9/2005 |

* cited by examiner

LENGTH MEASURING DIRECTION OF GRID SCALE
GENERATRIX DIRECTION OF CYLINDRICAL LENS

LENGTH MEASURING DIRECTION OF GRID SCALE

LENGTH MEASURING DIRECTION OF GRID SCALE

LENGTH MEASURING DIRECTION OF GRID SCALE

LENGTH MEASURING DIRECTION OF GRID SCALE

TELECENTRIC PHOTOELECTRIC ENCODER INCLUDING APERTURE IN FACE OF OPTICAL ELEMENT

CROSS-REFERENCE TO RELATED APPLICATION

This non-provisional application claims priority under 35 U.S.C. § 119(a) from Japanese Patent Application No. 2015-180529, filed on Sep. 14, 2015, the entire contents of which are incorporated herein by reference.

BACKGROUND

Technical Field

The present invention relates to a photoelectric encoder that uses a telecentric lens.

Related Art

WO 2005/090923 A discloses a photoelectric encoder including a double telecentric optical system in which a first lens is inserted between a main scale and a light receiving element along with a second lens and an aperture disposed at a focal position of the first lens. In the photoelectric encoder, signal detection efficiency is improved and the number of adjustment steps can be decreased due to loosed assembly tolerances.

SUMMARY OF THE INVENTION

However, in the photoelectric encoder of the related art, since the lens and the aperture are separate components, it is difficult to align the optical axis between the lens and the aperture and there is a need to ensure the aperture and a space for holding the aperture between the lenses. For this reason, the axis alignment of the optical system or a decrease in size thereof is difficult.

An object of the invention is to provide a photoelectric encoder capable of highly precisely aligning an optical axis while suppressing an increase in number of components of an optical system.

To solve the above described problem, a photoelectric encoder of the present invention includes: a scale which includes a grid scale; a light emitting portion which irradiates light toward the scale; a light receiving portion which detects an image of the grid scale of the scale; and a telecentric optical unit which is provided between the scale and the light receiving portion and forms the image of the grid scale on the light receiving portion, wherein the telecentric optical unit includes a first optical element which is disposed near the scale, a second optical element which is disposed near the light receiving portion in relation to the first optical element and is disposed so that a gap is formed between the second optical element and the first optical element, and an aperture which is provided in at least one of a face near the second optical element in the first optical element and a face near the first optical element in the second optical element.

According to such a configuration, since the aperture is provided in at least one of the first optical element and the second optical element, there is no need to provide the aperture as a separate component and to align an optical axis thereof. That is, the optical axis alignment of the aperture is also completed while the optical axis alignment between the first optical element and the second optical element is performed.

In the photoelectric encoder of the present invention, the grid scale may have a line-and-space pattern. Accordingly, it is possible to highly precisely obtain a signal in the light receiving portion by restricting an unnecessary passage of light which is a part of diffracted light generated in a line-and-space pattern.

In the photoelectric encoder of the present invention, the aperture may include a light shielding portion and a light transmitting portion. Further, the aperture may include a light scattering portion and a light transmitting portion. Accordingly, it is possible to suppress an unnecessary transmission of light in the light shielding portion or the light scattering portion in the telecentric optical unit.

In the photoelectric encoder of the present invention, the aperture may include a first aperture portion which is provided at the face near the second optical element in the first optical element and a second aperture portion which is provided at the face near the first optical element in the second optical element. Accordingly, it is possible to effectively suppress an unnecessary transmission of light in the aperture.

In the photoelectric encoder of the present invention, the aperture may restrict a passage of light rays each having an angle equal to or larger than a third diffraction angle among diffracted lights generated by the grid scale of the scale. Accordingly, it is possible to highly precisely obtain a sine wave by suppressing harmonic distortion of a light intensity distribution of an image in the light receiving portion.

In the photoelectric encoder of the present invention, the first optical element and the second optical element may be lenses having curvature only in one direction. Further, the first optical element and the second optical element may be formed as a lens array in which plurality of optical faces are arranged in parallel at an arbitrary pitch within a plane.

The photoelectric encoder of the present invention may further include a calculation unit which outputs a signal for detecting a position from an electric signal based on the image detected in the light receiving portion. Accordingly, it is possible to highly precisely calculate a signal for detecting a position from an electric signal detected by the light receiving portion.

The photoelectric encoder of the present invention may further include a calculation unit which outputs a sinusoidal quadrature signal from an electric signal based on the image detected in the light receiving portion. Accordingly, it is possible to detect a position at a pitch shorter than that of the grid scale of the scale.

DETAILED DESCRIPTION OF THE EMBODIMENTS

Hereinafter, preferred embodiments of the invention will be described with reference to the drawings. Further, in the description below, the same reference signs will be given to the same components and the description of the same components will be appropriately omitted.

First Embodiment

Figure 1:
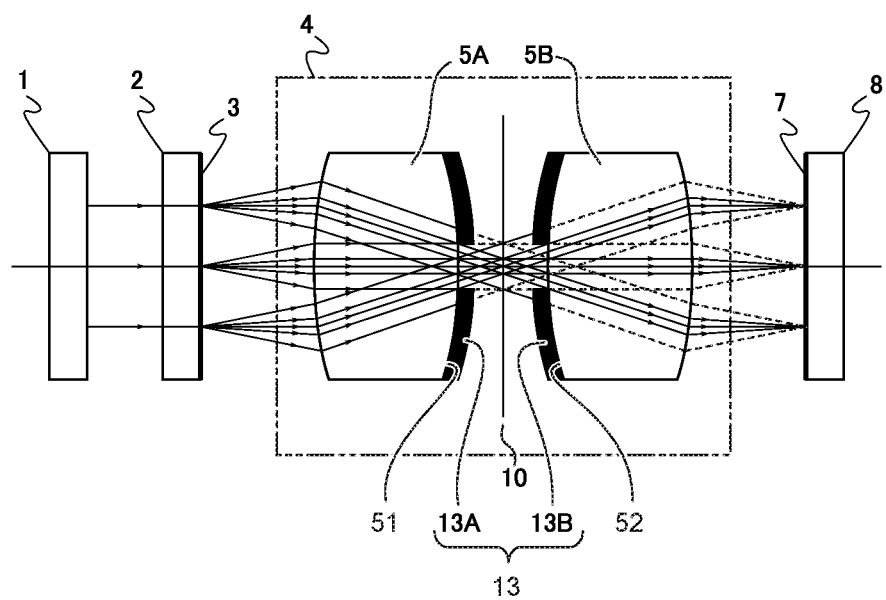
FIG. 1 is a configuration diagram exemplarily illustrating a photoelectric encoder according to a first embodiment.

FIG. 1 is a configuration diagram exemplarily illustrating a photoelectric encoder according to a first embodiment.

As illustrated in FIG. 1, the photoelectric encoder according to the embodiment includes an illumination system 1 which is a light emitting portion, a scale 2, an imaging optical system 4, and a light receiving element 8 which is a light receiving portion. The illumination system 1 irradiates light toward the scale 2 by parallel light rays so that the scale is illuminated by the parallel light rays. The scale 2 is provided with a grid scale 3 having a line-and-space pattern.

The imaging optical system 4 is a telecentric optical unit and is provided between the scale 2 and the light receiving element 8. The imaging optical system 4 forms an image 7 of the grid scale 3 on the light receiving element 8. The light receiving element 8 outputs an electric signal in response to the image 7. In the embodiment, a calculation circuit (not illustrated) is provided. The calculation circuit outputs a signal for detecting a position from an electric signal converted by the light receiving element 8. For example, the calculation circuit outputs a sinusoidal quadrature signal based on the electric signal converted by the light receiving element 8.

In the embodiment, the imaging optical system 4 is configured as a telecentric optical system having a one-time magnification. As a whole, the imaging optical system 4 is configured as an optical system which is rotationally symmetrical about an optical axis and is linearly symmetrical with respect to a position 10 where light rays in an entire field of view are collected.

The imaging optical system 4 includes first and second lenses 5A and 5B which are two optical elements and an aperture 13 which is provided between the first lens 5A and the second lens 5B. Each of the first lens 5A and the second lens 5B is a telecentric lens. It is desirable that the first lens 5A and the second lens 5B have the same shape.

The aperture 13 includes a first aperture 13A which is provided at a face 51 near the second lens 5B in the first lens 5A and a second aperture 13B which is provided at a face 52 near the first lens 5A in the second lens 5B. Each of the first aperture 13A and the second aperture 13B includes a light shielding portion and a light transmitting portion. The light transmitting portion is provided in a predetermined range about the optical axis and the light shielding portion is provided in the periphery of the light transmitting portion. As the light shielding portion, for example, a thin film of chrome (Cr) or a shading coating film with large absorbance such as ink is used.

The passage of light rays each having an angle equal to or larger than a third diffraction angle among diffracted lights generated by the grid scale 3 of the scale 2 can be interrupted by the light shielding portion in the aperture 13 including the first aperture 13A and the second aperture 13B. Meanwhile, the light rays each having an angle smaller than the third diffraction angle can be transmitted through the light transmitting portion.

According to such a configuration, since the aperture which is a separate component is not needed while a characteristic is kept in which the third or more diffracted lights among the diffracted lights generated by the grid scale 3 of the scale 2 after the light is irradiated from the illumination system 1 to the scale 2 are shielded by the aperture 13, the number of components can be decreased. Further, since the optical axis alignment of the aperture 13 is completed only by the optical axis alignment between the first lens 5A and the second lens 5B, the assembly can be easily performed.

Here, a desirable condition for the opening dimension of the aperture 13 will be described.

Figure 2:
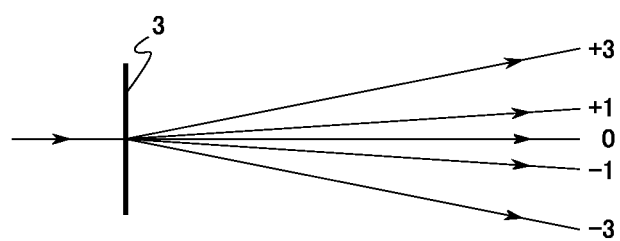
FIG. 2 is a schematic diagram illustrating diffracted light generated by a grid scale.

As a desirable condition for the opening dimension of the aperture 13 (the first aperture 13A and the second aperture 13B), the opening dimension is set to a size in which the zero-th diffracted lights (transmitted lights) and first diffracted lights among the diffracted lights generated by the grid scale 3 (having a pitch p) having a line-and-space pattern are transmitted and the third or more diffracted lights are restricted. FIG. 2 is a schematic diagram illustrating diffracted light generated by the grid scale 3. The optical paths illustrated in FIG. 1 are optical paths of the zero-th, first, and third diffracted lights illustrated in FIG. 2. The aperture 13 restricts the passage of the light rays each having an angle equal to or larger than the third diffraction angle.

In the photoelectric encoder, the image 7 of the grid scale 3 is detected by the light receiving element 8. The light receiving element 8 is equipped with a photo diode array having a positional phase difference of 90°. Based on a signal of the photo diode array, a sinusoidal quadrature signal can be obtained finally.

Even when a light intensity distribution cross-section 16 obtained immediately after the light is transmitted through the grid scale 3 is a rectangular wave shape with a period p, only the zero-th and first diffracted lights are used to form an image and thus the light intensity distribution cross-section 17 of the image 7 has a sine wave shape with a period p. Accordingly, it is possible to suppress harmonic distortion of a sinusoidal quadrature signal which is obtained finally.

Further, it is assumed that the strength of the diffracted light generated by the grid scale 3 and causing the light intensity modulation of the rectangular wave shape is dominant in the odd-number-th elements like the first, third, fifth, . . . elements and the diffraction intensities of the even-number-th elements are negligibly small. Thus, an influence of the even-number-th diffracted lights will not be considered later.

Figure 3:
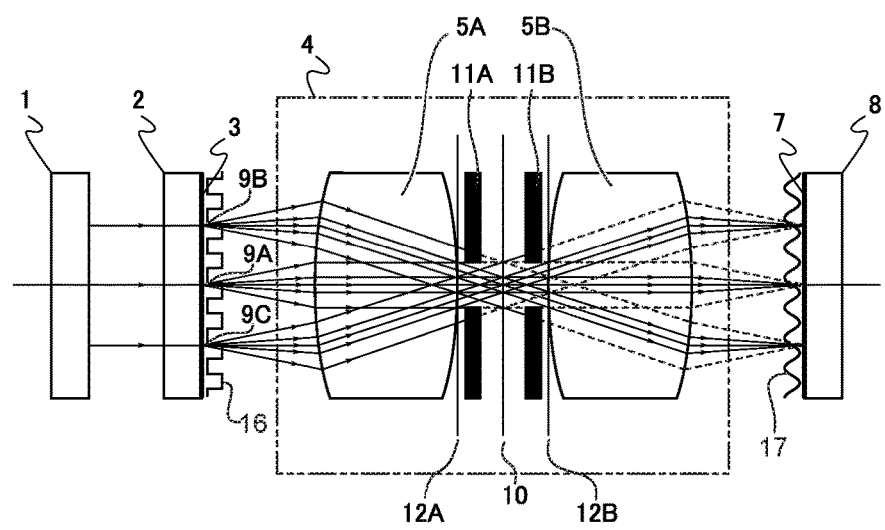
FIG. 3 is a configuration diagram which is optically equivalent to the configuration illustrated in FIG. 1.

FIG. 3 is a configuration diagram which is optically equivalent to the configuration illustrated in FIG. 1.

In FIG. 3, the first aperture 13A and the second aperture 13B illustrated in FIG. 1 are respectively substituted by a first aperture 11A and a second aperture 11B. The first aperture 11A and the second aperture 11B are disposed at a position symmetrical with respect to the position 10 and these apertures serve as one aperture.

The positions and the opening dimensions of the first aperture 11A and the second aperture 11B may be set to meet a condition in which the first diffracted light passes in an entire field of view region (a field of view end 9B, a field of view center 9A, and a field of view end 9C) and the unnecessary third or more diffracted lights are shielded.

In FIG. 3, a position in which the first aperture 11A and the second aperture 11B can be separated from the position 10 as much as possible corresponds to the positions of faces 12A and 12B in which the third diffracted light emitted from the field of view center 9A intersects the first diffracted lights emitted from the field of view ends 9B and 9C. Then, the dimension of the aperture necessary at that time is given as a distance from the optical axis to an intersection point of the third diffracted light and the first diffracted light.

According to such an embodiment, the aperture 13 which is set to have a desirable opening dimension does not need to be provided as a separate component and thus the optical axis alignment thereof is not needed. Thus, the optical axis alignment of the aperture 13 is also completed when the optical axis alignment between the first lens 5A and the second lens 5B is performed. Further, since the first lens 5A and the second lens 5B each having the aperture 13 and having the same shape may be provided, the number of components can be decreased compared with the case where the aperture 13 is provided as a separate component.

Second Embodiment

Figure 4:
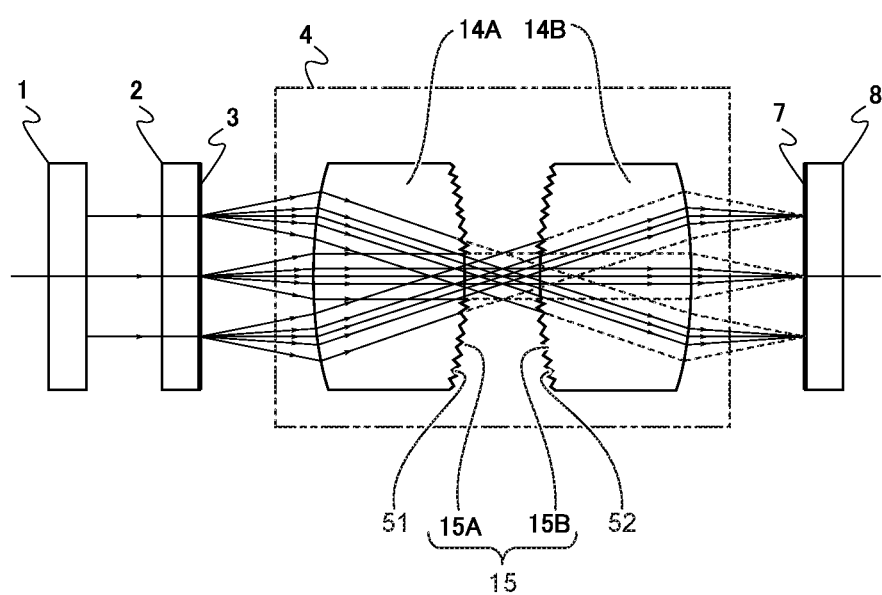
FIG. 4 is a configuration diagram exemplarily illustrating a photoelectric encoder according to a second embodiment.

FIG. 4 is a configuration diagram exemplarily illustrating a photoelectric encoder according to a second embodiment.

As illustrated in FIG. 4, the photoelectric encoder according to the embodiment includes a light diffusing portion as the aperture 13 instead of the light shielding portion. The other configurations are similar to those of the photoelectric encoder according to the first embodiment.

That is, the imaging optical system 4 is equipped with a first lens 14A and a second lens 14B. A first aperture 15A is provided at a face 51 near the second lens 14B in the first lens 14A and a second aperture 15B is provided at a face 52 near the first lens 14A in the second lens 14B. Each of the first aperture 15A and the second aperture 15B includes a light diffusing portion and a light transmitting portion. The light transmitting portion is provided in a predetermined range about the optical axis and the light diffusing portion is provided in the periphery of the light transmitting portion. The light diffusing portion is a portion which is roughened by performing a surface treatment on a predetermined area of each of the faces 51 and 52.

Since each of the first aperture 15A and the second aperture 15B is provided with the light diffusing portion, the light diffusing portion can diffuse a passage of a light ray having an angle equal to or larger than a third diffraction angle among diffracted lights generated by the grid scale 3 of the scale 2. Meanwhile, a light ray having an angle smaller than the third diffraction angle can be transmitted through the light transmitting portion.

According to such an embodiment, it is possible to form the first aperture 15A and the second aperture 15B just by performing a surface treatment on the faces 51 and 52 of the first lens 14A and the second lens 14B.

Third Embodiment

Figure 5:
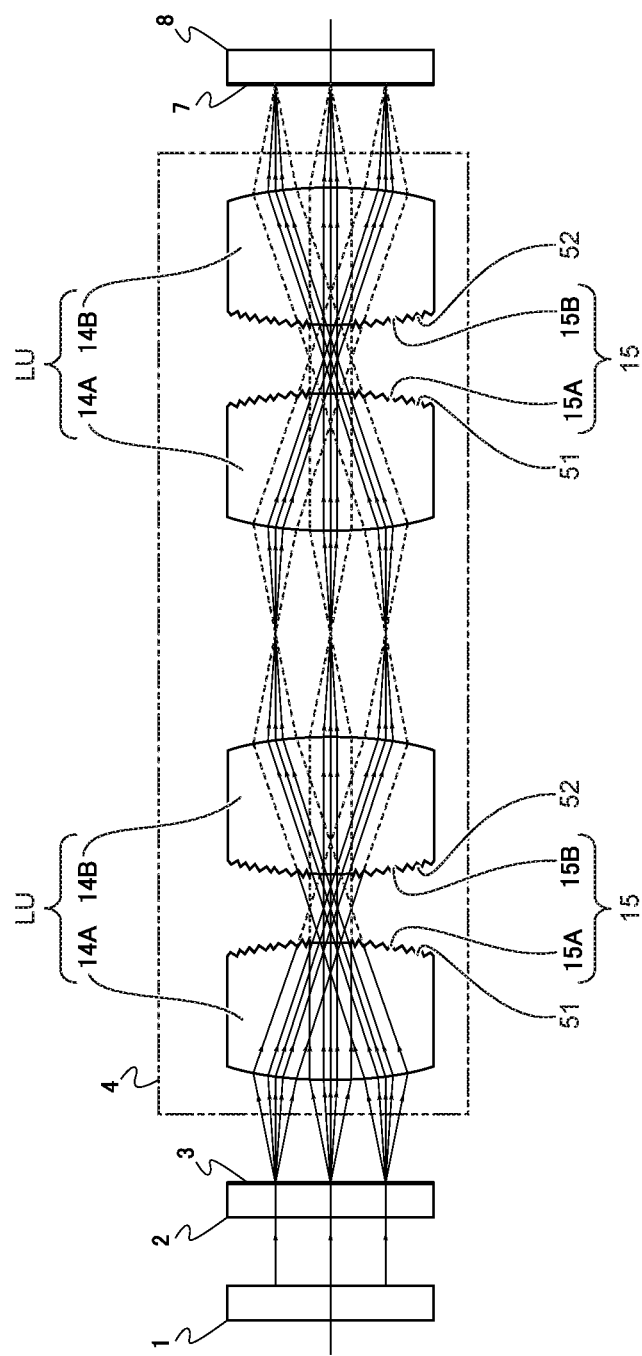
FIG. 5 is a configuration diagram exemplarily illustrating a photoelectric encoder according to a third embodiment.

FIG. 5 is a configuration diagram exemplarily illustrating a photoelectric encoder according to a third embodiment.

As illustrated in FIG. 5, the photoelectric encoder according to the embodiment has a configuration in which a set of lens units LU including the first lens 14A and the second lens 14B are provided and two sets of the lens units LU are provided. In the example illustrated in FIG. 5, the first lens 14A and the second lens 14B according to the second embodiment are used, but the first lens 5A and the second lens 5B according to the first embodiment maybe used as the lens unit LU. Further, these lens units LU may be used in combination. Further, three sets or more of the lens units LU may be provided. In this way, even when a plurality of sets of the lens units LU are provided, the same effect as those of the first embodiment and the second embodiment can be obtained.

Fourth Embodiment

Figure 6A:
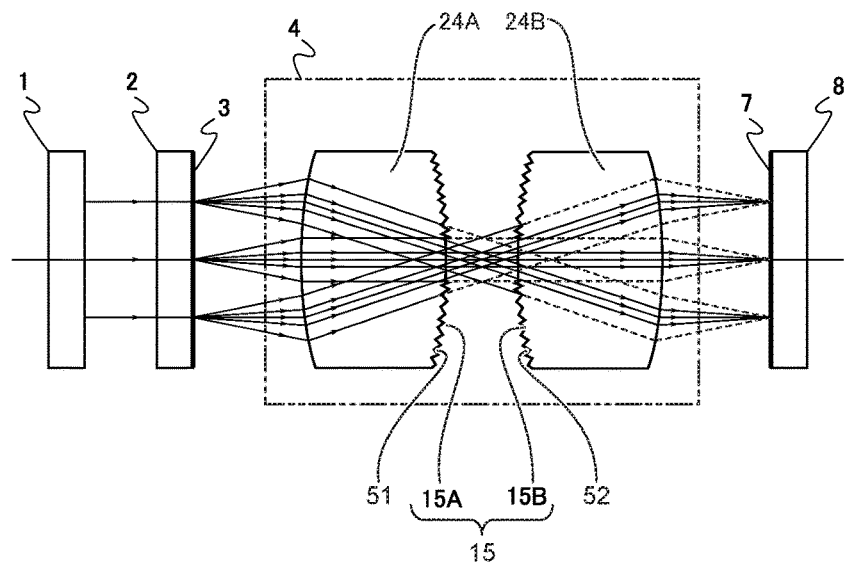
FIGS. 6A to 6C are configuration diagrams exemplarily illustrating a photoelectric encoder according to a fourth embodiment.
Figure 6B:
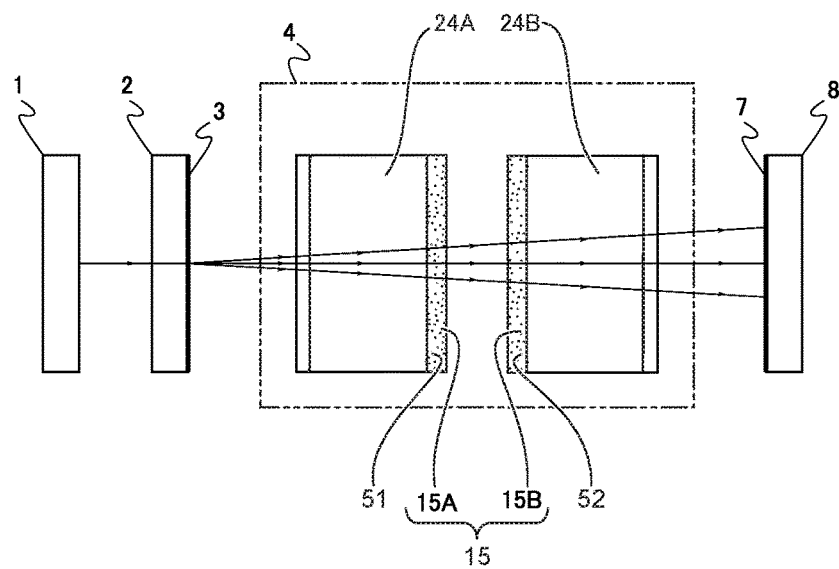
Figure 6C:
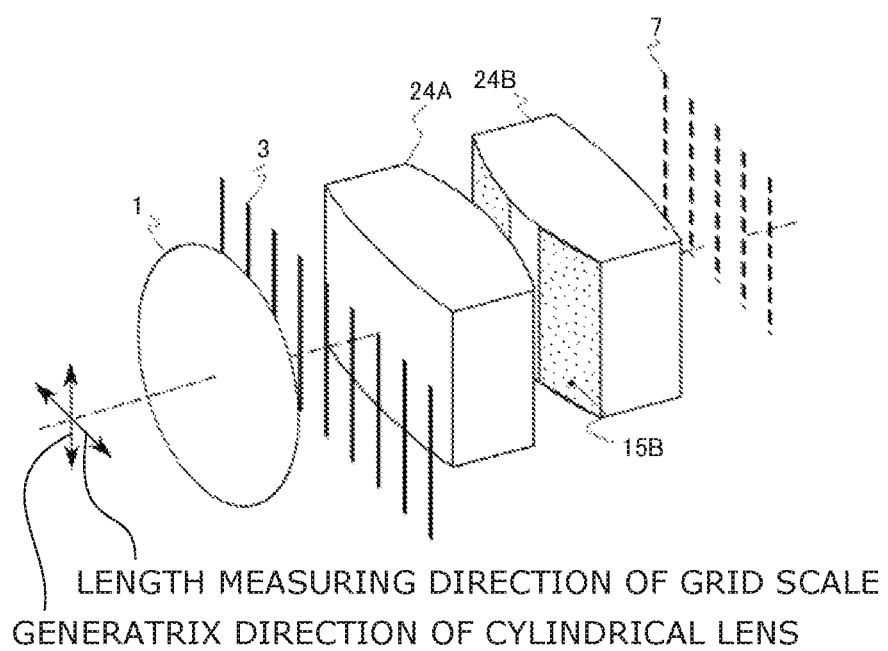

FIGS. 6A to 6C are schematic diagrams exemplarily illustrating a photoelectric encoder according to a fourth embodiment. FIG. 6A is a top configuration diagram, FIG. 6B is a side configuration diagram, and FIG. 6C is a perspective view.

The imaging optical system 4 used in the embodiment includes a first cylindrical lens 24A and a second cylindrical lens 24B. The other configurations are similar to those of the photoelectric encoder according to the second embodiment.

The first cylindrical lens 24A and the second cylindrical lens 24B have optical faces with curvature only in one direction. The optical face is, for example, a spherical cylindrical lens face or a non-spherical cylindrical lens face having a shape expressed by a high-order polynomial equation.

According to the embodiment, a resolution in a generatrix direction of the lens is not obtained, but instead the optical axis alignment of the component in the generatrix direction is not needed. Accordingly, the assembly is relatively easy. Even in this case, the same effect as that of the second embodiment can be obtained.

Fifth Embodiment

Figure 7A:
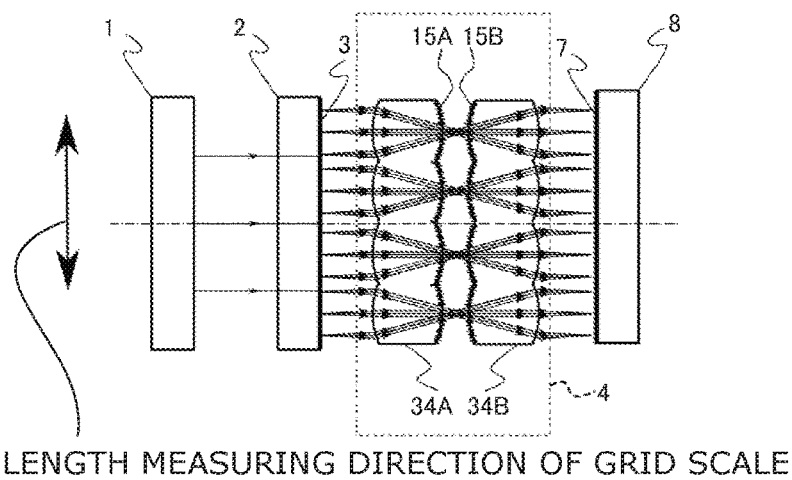
FIGS. 7A and 7B are schematic diagrams exemplarily illustrating a photoelectric encoder according to a fifth embodiment.
Figure 7B:
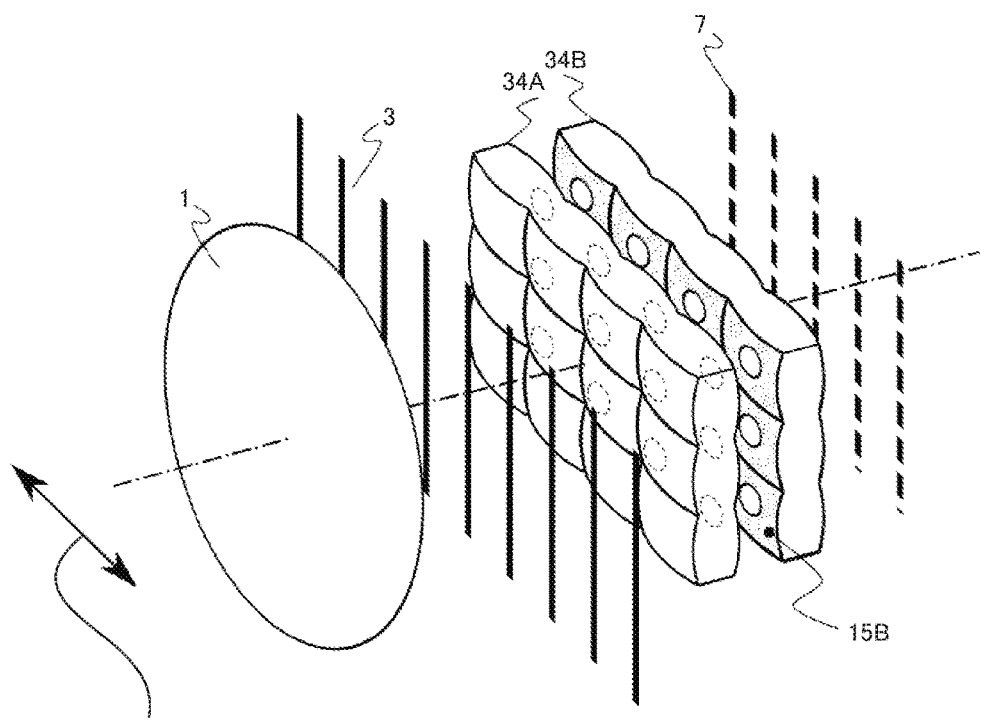

FIGS. 7A and 7B are schematic diagrams exemplarily illustrating a photoelectric encoder according to a fifth embodiment. FIG. 7A is a top configuration diagram and FIG. 7B is a perspective view.

The imaging optical system 4 used in the embodiment includes a first lens array 34A and a second lens array 34B. Each of the first lens array 34A and the second lens array 34B has a configuration in which an optical element of the first embodiment, the second embodiment, and the fourth embodiment is formed as a lens array (a lens in which a plurality of optical faces are disposed in parallel at an arbitrary pitch).

As an example, FIGS. 7A and 7B illustrate a configuration in which the optical faces of the first lens 14A and the second lens 14B including the light diffusing portion according to the second embodiment are uses as the optical faces of the first lens array 34A and the second lens array 34B.

In the embodiment, the lens array obtained by arranging lenses each having a small diameter and a short focal distance compared to the imaging optical system 4 without the lens array. Accordingly, it is possible to shorten the entire length of the optical system while keeping an effective field of view of the imaging optical system in the entire imaging optical system 4. Accordingly, it is possible to obtain an effect suitable for a decrease in size of the entire optical system and to obtain the same effect as those of the first embodiment, the second embodiment, and the fourth embodiment.

Sixth Embodiment

Figure 8A:
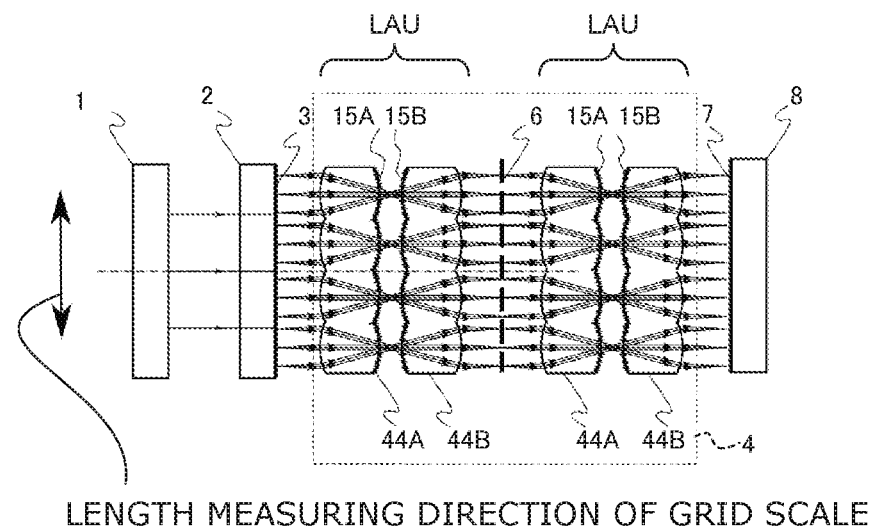
FIGS. 8A and 8B are schematic diagrams exemplarily illustrating a photoelectric encoder according to a sixth embodiment.
Figure 8B:
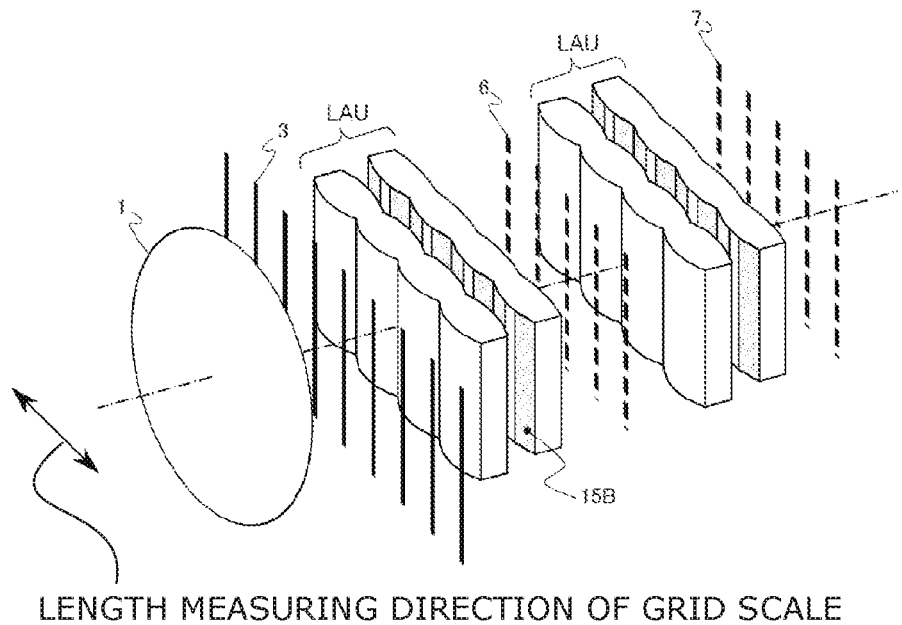

FIGS. 8A and 8B are schematic diagrams exemplarily illustrating a photoelectric encoder according to a sixth embodiment. FIG. 8A is a top configuration diagram and FIG. 8B is a perspective view.

Figure 9:
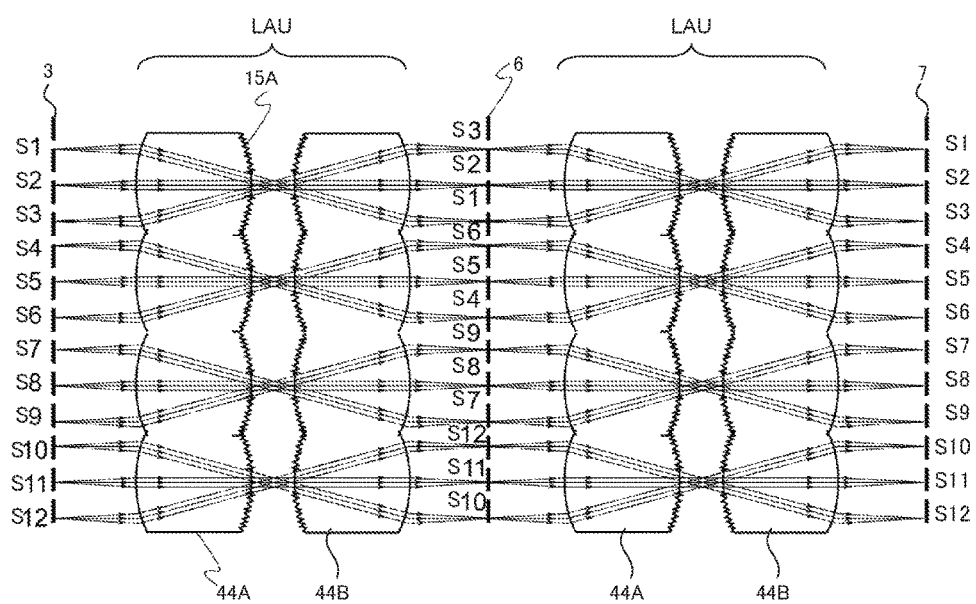
FIG. 9 is a schematic diagram illustrating imaging of the photoelectric encoder according to the sixth embodiment.

FIG. 9 is a schematic diagram illustrating imaging of the photoelectric encoder according to the sixth embodiment.

The imaging optical system 4 used in the embodiment includes two sets of the lens array units LAU. In each lens array unit LAU, the first cylindrical lens array 44A and the second cylindrical lens array 44B are used instead of the first lens 14A and the second lens 14B of the lens unit LU used in the third embodiment.

In the embodiment, as illustrated in FIG. 9, inverted intermediate images 6 of images S1 to S12 of the grid scale 3 are formed at a lens pitch of the first set of the lens array units LAU. Further, the inverted intermediate image 6 is formed by the second set of the lens array units LAU having the same pitch as that of the first set of the lens array units LAU and thus an erect image (the image 7) is obtained. This configuration has a desirable characteristic in which the position and the direction of a final image are equal to the position and the direction of an original grid regardless of the lens pitch of the lens array unit LAU. Further, even in the embodiment, the same effect as those of the other embodiments can be obtained.

Further, each of the first cylindrical lens array 44A and the second cylindrical lens array 44B applied to the lens array unit LAU may be a cylindrical lens array provided with a shielding portion instead of a light diffusing portion.

Application Example

Figure 10:
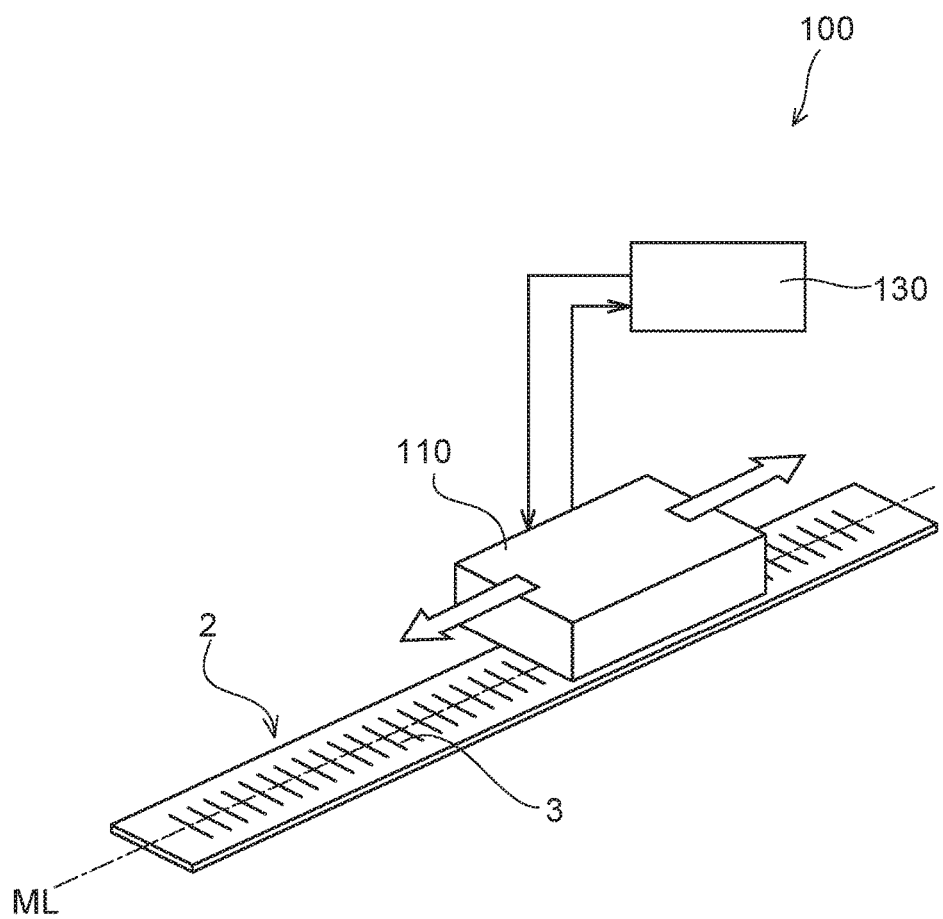
FIG. 10 is a schematic diagram illustrating an application example.
Figure 11:
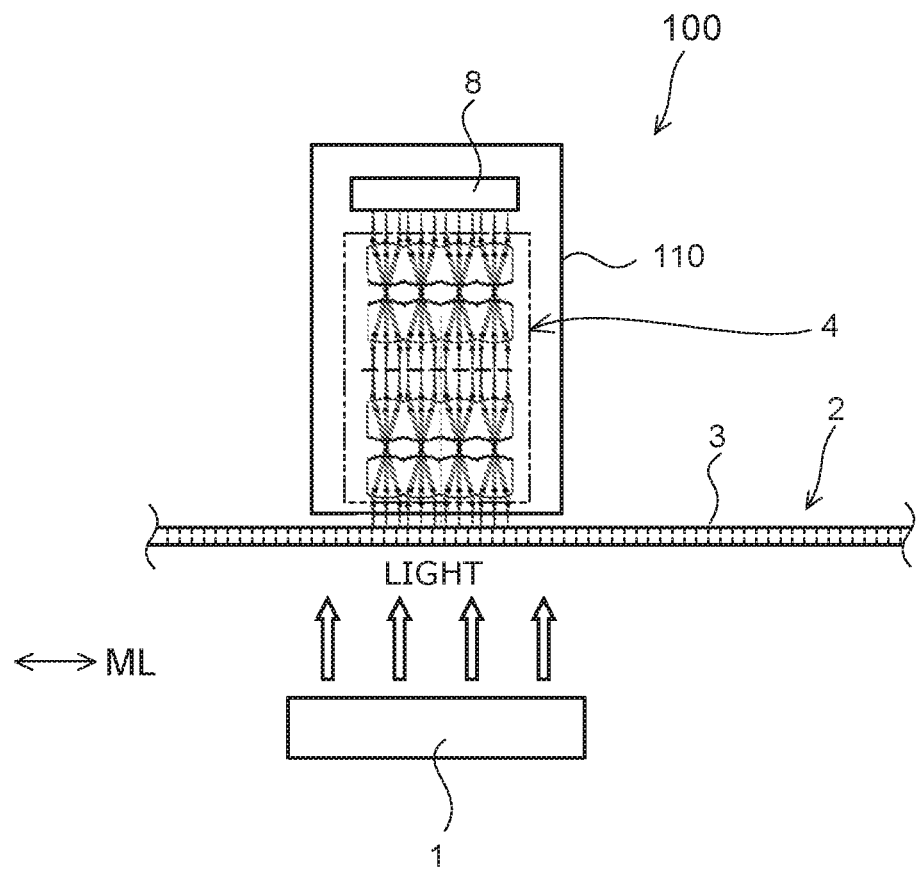
FIG. 11 is a schematic diagram illustrating an application example.

FIGS. 10 and 11 are schematic diagrams illustrating an application example.

FIGS. 10 and 11 illustrate an example in which a photoelectric encoder according to the embodiment is applied to a linear scale 100. As illustrated in FIG. 10, the linear scale 100 includes a detection unit 110 and the scale 2. The scale 2 includes the plurality of grid scales 3 disposed along a measurement line ML. A line-and-space pattern is used in the grid scale 3. A control unit 130 is connected to the detection unit 110. In the linear scale 100, a relative positional relation between the detection unit 110 and the scale 2 along the measurement line ML is detected. A signal obtained by the detection unit 110 is sent to the control unit 130 so that the position of the detection unit 110 with respect to the measurement line ML is calculated.

FIG. 11 illustrates the configuration of the detection unit 110. The detection unit 110 is equipped with the photoelectric encoder according to the embodiment. In the linear scale 100, diffracted light generated by the grid scale 3 after light is emitted from the illumination system 1 toward the grid scale 3 is received by the light receiving element 8 through the imaging optical system 4. Here, a displacement amount is measured by the detection of a change in light receiving amount.

Since the imaging optical system 4 according to the embodiment is used as the optical system of the detection unit 110 of the linear scale 100, it is possible to simplify the configuration of the optical system of the detection unit 110 and to highly precisely measure the displacement by satisfactory telecentricity.

As described above, according to the embodiment, it is possible to provide a photoelectric encoder capable of highly precisely aligning an optical axis while suppressing an increase in number of components.

While the embodiments have been described above, the invention is not limited to these examples. For example, an example has been described above in which the first apertures 13A and 15A are provided at the faces 51 of the first lenses 5A and 14A and the second apertures 13B and 15B are provided at the faces 52 of the second lenses 5B and 14B, but at least one of the first apertures 13A and 15A and the second apertures 13B and 15B may be provided. Further, in the embodiment, a configuration has been exemplified in which the image 7 of the diffracted light irradiated from the illumination system 1 and transmitted through the scale 2 is detected by the light receiving element 8, but the image of the diffracted light irradiated from the illumination system 1 and reflected by the scale 2 may be detected by the light receiving element 8. Further, the grid scale of the scale may have a pattern (for example, an ABS pattern disposed in a pseudo random code sequence) other than the line-and-space pattern. Additionally, the lenses (the first lenses 5A and 14A and the second lenses 5B and 14B) are exemplified as the optical elements, but the optical elements may include a reflection optical system such as a mirror. Further, various additions, deletions, or modifications of the components of the above-described embodiments made by the person skilled in the art or a combination of the characteristics of the above-described embodiments are also included in the scope of the invention without departing from the spirit of the invention.

INDUSTRIAL APPLICABILITY

The invention can be suitably used as an optical system of an optical device such as a microscope or other measurement devices such as an image measurement device other than the linear scale.

What is claimed is:

1. A photoelectric encoder comprising:
a scale which includes a grid scale;
a light emitting portion which irradiates light toward the scale;
a light receiving portion which detects an image of the grid scale of the scale; and
a telecentric optical unit which is provided between the scale and the light receiving portion and forms the image of the grid scale on the light receiving portion, wherein the telecentric optical unit includes
a first optical element which is disposed near the scale,
a second optical element which is disposed near the light receiving portion in relation to the first optical element and is disposed so that a gap is formed between the second optical element and the first optical element, and
an aperture which is provided in at least one of a face near the second optical element in the first optical element and a face near the first optical element in the second optical element.

2. The photoelectric encoder according to claim 1, wherein the grid scale has a line-and-space pattern.

3. The photoelectric encoder according to claim 1, wherein the aperture includes a light shielding portion and a light transmitting portion.

4. The photoelectric encoder according to claim 1, wherein the aperture includes a light scattering portion and a light transmitting portion.

5. The photoelectric encoder according to claim 1, wherein the aperture includes
a first aperture portion which is provided at the face near the second optical element in the first optical element and a second aperture portion which is provided at the face near the first optical element in the second optical element.

6. The photoelectric encoder according to claim 1, wherein the aperture restricts a passage of light rays each having an angle equal to or larger than a third diffraction angle among diffracted lights generated by the grid scale of the scale.

7. The photoelectric encoder according to claim 1, wherein the first optical element and the second optical element are lenses having curvature only in one direction.

8. The photoelectric encoder according to claim 1, wherein the first optical element and the second optical element are formed as a lens array in which a plurality of optical faces are arranged in parallel at an arbitrary pitch within a plane.

9. The photoelectric encoder according to claim 1, further comprising a calculation unit which outputs a signal for detecting a position from an electric signal based on the image detected in the light receiving portion.

10. The photoelectric encoder according to claim 2, further comprising a calculation unit which outputs a sinusoidal quadrature signal from an electric signal based on the image detected in the light receiving portion.

* * * * *